United States Patent [19]

Reiman et al.

[11] 3,962,097
[45] June 8, 1976

[54] SPIRAL-WOUND FILTER

[75] Inventors: Peter A. Reiman, Weston; Paul J. Cook, Manchester, both of Mass.

[73] Assignee: Millipore Corporation, Bedford, Mass.

[22] Filed: Apr. 22, 1971

[21] Appl. No.: 136,332

[52] U.S. Cl. .............................. 210/435; 210/487; 210/494 R; 210/497 R
[51] Int. Cl.² ....................................... B01D 27/00
[58] Field of Search ........... 210/492, 494, 497, 435, 210/446, 447, 451, 455, 487

[56] References Cited
UNITED STATES PATENTS

| | | | |
|---|---|---|---|
| 1,872,430 | 8/1932 | Ericson | 210/494 X |
| 2,322,548 | 6/1943 | Sigmund | 210/494 X |
| 2,883,058 | 4/1959 | Jaume | 210/494 X |
| 3,510,004 | 5/1970 | Hoeltzenbein | 210/494 X |

FOREIGN PATENTS OR APPLICATIONS 1,189,159  9/1959  France ............................. 210/494

*Primary Examiner*—Charles N. Hart
*Assistant Examiner*—F. F. Calvetti

[57] ABSTRACT

A filter unit formed by spirally winding a multi-layer material around a core to form a generally cylindrical construction having two opposing spiral end surfaces. The multilayer material has at least two filter layers and at least two spacer layers formed from a material with a high void volume. The multi-layer material need not include a fluid-impermeable layer. The layers are arranged and adhered along the lengthwise and widthwise edges so that, in use, unfiltered fluid passing through one spiral surface of the filter unit into one spacer layer must pass through a filter layer prior to passing out of the construction through the opposing spiral end surface.

12 Claims, 5 Drawing Figures

SPIRAL-WOUND FILTER

This invention relates to a spiral-wound filter construction.

BACKGROUND OF THE INVENTION

In filtration, it is desirable to maximize filter area while minimizing the volume of the filter construction employed. One common means for attaining this result is to provide a construction formed by spirally winding a multi-layer material having a filter layer to form a tightly wound cylinder into which liquid is introduced at one spiral end and removed from the opposite spiral end. Means must be provided in the filter construction for assuring that all entering liquid passes through the filter medium prior to being removed, that is, the entering liquid must be prevented from simply passing through the spaces between the wound filter material without passing through the filter medium. It has been heretofore proposed to employ corrugated filter media in spiral wound filter constructions to maximize filter surface area for a given filter construction volume. In these constructions, sealing arrangements are provided at each spiral surface of the wound filter to assure that incoming fluid passes through a filter surface before leaving the filter unit. Such constructions are shown for example in U.S. Pat. Nos. 2,322,548 and 2,599,604 and 3,025,963. However, a corrugated spiral wound filter construction has undesirable strength characteristics which has limited its use. When fluid is introduced into the corrugated construction, even under moderate pressure or when filter loading is increased due to particle accumulation, the flutes become compressed along their entire length resulting in severe stress being placed upon the filter material. Under these compression forces, the chances of rupturing the filter material and rendering the construction useless are greatly increased. Due to these undesirable strength characteristics, practical utilization of filter units of this type i.e., with corrugated filter material, have had only limited usage. It would be highly desirable to provide a filter construction having a large filter area per unit volume and which permits the use of relatively high differential pressures across the filter material without a high risk of rupturing the filter medium.

A spiral-wound filter construction having such improved strength characteristics is described in an application entitled SPIRAL-WOUND FILTER filed Apr. 22, 1971, Ser. No. 136,315, now U.S. Pat. No. 3,722,696 in the names of James Dwyer and Peter Reiman and assigned to the assignee of this application. The filter is formed by spirally winding a multilayer web comprising at least one fluid-impermeable layer, at least one filter layer and at least two generally flat spacer layers having a high void volume. The spacer layers are permeable to edgewise fluid flow and are positioned adjacent each surface of the filter layer. They provide support for the filter material and a means for fluid to pass axially through the wound filter. The spacer layers are selectively sealed so that, in use, unfiltered fluid entering one spiral end surface must pass through at least one filter layer prior to leaving the opposing spiral end surface. In the construction disclosed in the foregoing application, the fluid-impermeable layer is employed to separate spacer layers sealed from the atmosphere on opposing spiral end surfaces, i.e., to separate a spacer layer one of whose edges is open on the upstream side from a spacer layer, one of whose edges is open on the downstream side.

Although this construction has great advantages over the prior art construction because of its greatly improved strength characteristics, it, like the prior art constructions, employs a fluid-impermeable layer to attain the desired fluid flow. It would be highly desirable to eliminate the fluid-impermeable layer since it is essentially a "non-working" layer in that it blocks fluid passage and does not filter incoming fluid. Thus, the fluid-impermeable layer increases the volume of a wound filter construction without increasing its filtration capacity. Accordingly, it would be highly desirable to provide a spirally-wound filter construction which eliminates the need for a fluid impermeable layer yet has high strength characteristics which permit high fluid-flow rates therethrough even at high pressures.

SUMMARY OF THE INVENTION

Our invention provides a spiral-wound filter construction formed by winding a flat multi-layer web and sealing the layers in a configuration assuring that fluid entering the construction through one spiral end surface passes through at least one filter layer prior to leaving the construction. We have found that if a multi-layer web comprising at least two generally flat spacer layers which are permeable to edgewise flow and at least two filter layers interleaved therewith is wound to form a spiral filter, a compact filter unit is provided which does not require a fluid-impermeable layer. The spirally-wound construction is selectively sealed at each spiral end surface and along the width of the layers at their ends to assure that fluid entering the construction through one spiral end surface must pass through a filter layer prior to being removed from the construction through the opposing spiral end surface. One set of spacer layers contacting a first surface of each filter layer is sealed from the atmosphere on a first spiral end surface and open to the atmosphere on the second spiral end surface. A second set of spacer layers contacting the second surface opposing the first surface of each filter layer is closed to the atmosphere on the second spiral end surface and open to the atmosphere on the first spiral end surface. The filter layers and spacer layers in the multi-layer web are interleaved to prevent contact of spacer layers open on opposing spiral end surfaces. To prevent incoming fluid from entering the widthwise edges of the wound construction and intermixing with filtered fluid prior to passing through a filter surface, one of the sets of spacer layers is sealed from the atmosphere along the widthwise edges adjacent the center of the spiral and remote from the center of the spiral. To prevent unfiltered fluid from passing through the center of the spiral, the center of the spiral is sealed adjacent at least one spiral end surface. The construction may or may not have a fluid-impermeable outer protective layer.

BRIEF DESCRIPTION OF THE DRAWINGS

The invention will be more fully described with reference to the accompanying drawings.

DESCRIPTION OF SPECIFIC EMBODIMENTS

Figure 1:
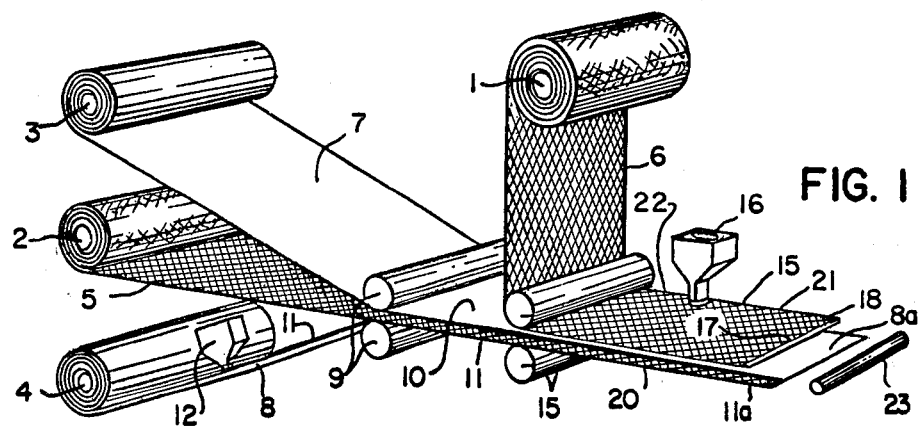
FIG. 1 is a schematic diagram of one method of forming the spiral filter construction of our invention.

As shown in FIG. 1, a spacer material having a high percentage of void volume and which is permeable to edgewise flow is stored respectively on storage rolls 1 and 2 and flexible filter material is stored on storage rolls 3 and 4. The spacer layer 5 and the filter layers 7 and 8 are passed through a set of rollers 9 so that they are held in close relationship across their width to form a multi-layer web 10. An adhesive strip 11 is dispensed from dispenser 12 and placed upon the moving filter layer 8 as it is unrolled from storage roller 4 so that when contacted with spacer layer 5, which is permeable to the adhesive and filter layer 7, a seal is formed by adhering the three layers 5, 7 and 8 as they are passed between rollers 9.

The adhesive employed does not effect immediate permanent adhesion of the layers when the webs pass between the pressure rollers. The adhesive is chosen so that the multi-layer web can be rolled on the core 23 prior to curing the adhesive and the adhesive is cured after the spiral filter construction is formed. Sufficient adhesive is employed to provide the desired seal between adjacent layers of the web but in amounts less than will migrate through the filter layer and cause undesirable sealing on the opposing filter surface at the same spiral end.

A spacer layer 6, similar to layer 5, is unrolled from storage roller 1 and passed, together with multi-layer web 10, between rollers 15. Adhesive material also is dispensed from the movable dispenser 16 to form a widthwise strip 17 at or near the leading edge 18 of the multi-layer web 20 and a lengthwise strip 21 at or near the lengthwise edge 22 of the multi-layer web 20. As shown in FIG. 1, there is a tab 8a of layer 4 which extends to the right beyond the multi-layer web. The adhesive strip on this tab is identified as 11a. When the multi-layer web 20 is rolled on filter core 23, adhesive strip 11a on tab 8a will contact and adhere to the core for one revolution, thereby sealing the adhesive strips 17 and 21 to the filter layer 8. After one revolution of the core 23 in contact with the multi-layer web 20, adhesive strip 21 will adhere to filter layer 8 on the surface and lengthwise edge opposite the surface and lengthwise edge upon which adhesive strip 11 is placed. The desired filter length is attained by cutting the layers 5, 6 and 7 and 8 widthwise. An adhesive strip 24 (See FIG. 3) is applied to the following widthwise edge of the spacer layer 6 so that the final adhesive strip configuration on spacer 6 is U shaped. It should be noted that the adhesive not only adheres the layers together but also fills the pores in the portion of the filter layers which it contacts making these substantially impermeable.

The fluid flow path will be described with reference to FIGS. 2 and 3. As shown therein, the filter unit of our invention is shown enclosed in a housing 29. Incoming liquid enters opening 28 of housing 29 and is directed to the top surface 30 of filter unit or cartridge 32 and into the space 31 between the side wall of the housing 29 and the filter cartridge 32. Fluid is prevented from by-passing the filter cartridge 32 by means of sealing wall 33 at the bottom of the unit. Incoming fluid fills the space 31 and then is free to pass downwardly through the filter cartridge 32 by entering the void volume in spacer layer 5 by edgewise flow and passing downwardly therein and through the filter layers 7 and 8 into the spacer layer 6. Since the spacer 6 is unsealed on the bottom surface 45, the fluid is free to pass downwardly therethrough and out of the filter 32 into space 36 formed by the sealing wall 33, the bottom surface 45 of the filter unit and the bottom of housing 29. The filtrate passes out of the space 36 through holes 37 in the bottom of the housing 29 into a fluid collector whose side walls are indicated at 38. Unfiltered fluid is prevented from passing between the outside surface of core 23 and the adhacent spacer layer 6 by means of the adhesive strip 11a adhering the filterlayer 8a to the core 23 and layers 6 and 7. Unfiltered fluid in space 31 also can enter the filter 32 through the outermost filter layer 8. However, such fluid entering through filter 8 from the space 31 would have to pass through filter layer 8, spacer layer 5, and filter layer 7 to get to spacer layer 6 which permits the fluid to pass out of the construction. The pressure differential between space 31 and space 36 is generally not sufficient to cause such flow.

In practice, we have found that if it is desired to filter fluid from space 31, it is desirable to cut the layers 6 and 7 longer than 5 and 8 to permit an extra wrap of layers 6 and 7 around the outside of the unit. In this way, fluid in the space 31 need pass through only one filter layer, i.e., filter layer 7, and can leave the unit through the spacer layer 6. In this embodiment, the adhesive configuration is such that the spacer layer adjacent the inside surface of the outermost filter layer is open on the bottom spiral end surface and sealed at the top spiral end surface. Thus, the fluid between the filter housing and the outside surface of the spirally wound filter need pass through only one filter layer prior to exiting the filter construction. Unfiltered fluid is prevented from entering the width of spacer 6 by means of adhesive strip 24. (See FIG. 3)

Figure 3:
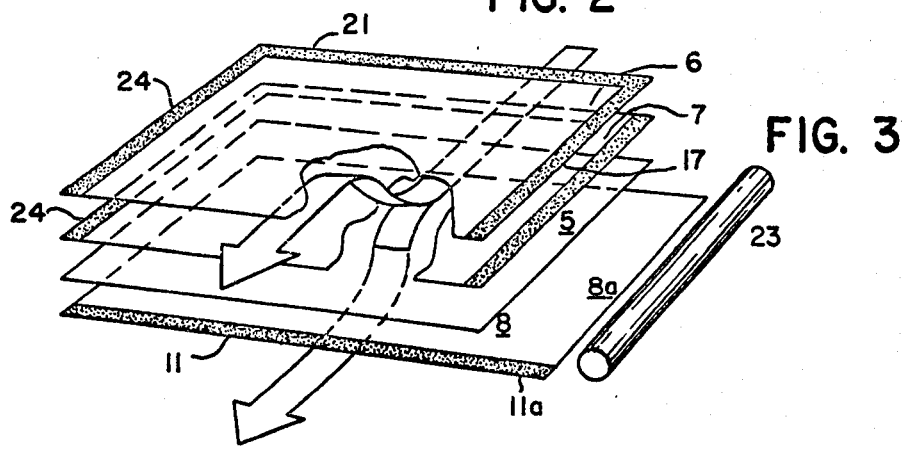
FIG. 3 is an isometric view of the spiral-wound filter of FIG. 2 when unwound, the relative length of the layers being shortened.

As shown in FIG. 3, the filter layer 8 forms the bottom surface of the multi-layer web with the upper layers including respectively, the spacer layer 5, the filter layer 7, and another spacer layer 6. These layers are adhered in the manner described above. The adhesive strip 17 fills the voids in spacer layer 6 and adheres spacer layer 6 to the adjacent portion of filter layer 7 thereby preventing incoming fluid from entering the cartridge 32 into the spacer 6 on the downstream side of the filter layers 7 and 8. The adhesive strips 17 and 24 are applied to the desired locations, depending upon the size of the filter desired, by halting the moving webs and applying the adhesive across the width of the spacer layer 6.

Figure 2:
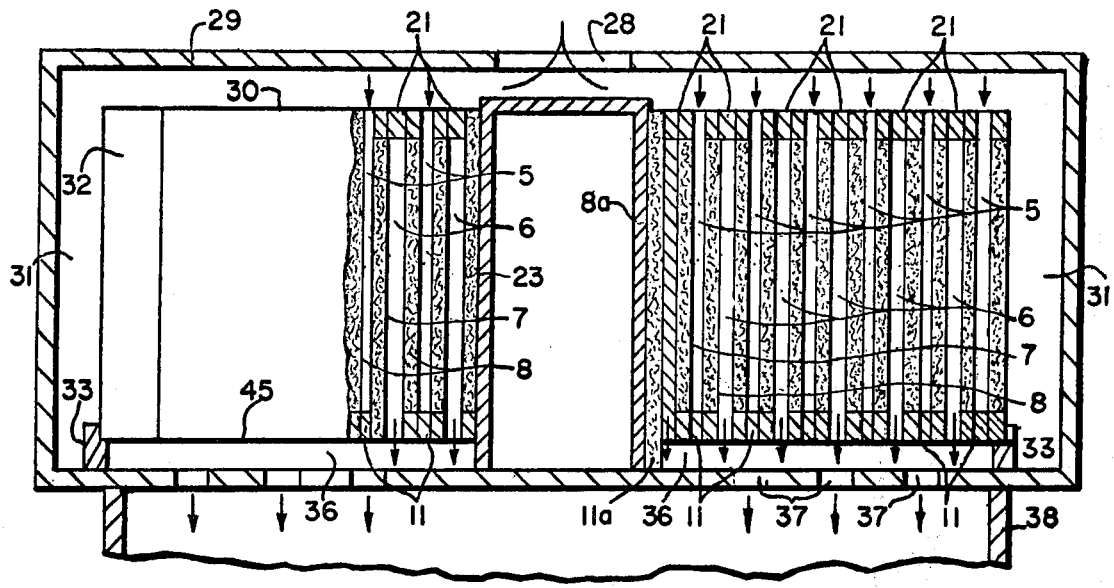
FIG. 2 is a partial vertical cross-sectional view of a preferred embodiment of the spiral filter construction.

If desired, the spirally wound filter can be wrapped with a separate fluid-impermeable layer; however, the construction shown in FIGS. 2 and 3 is preferred since the liquid in space 31 may be processed.

Figure 4:
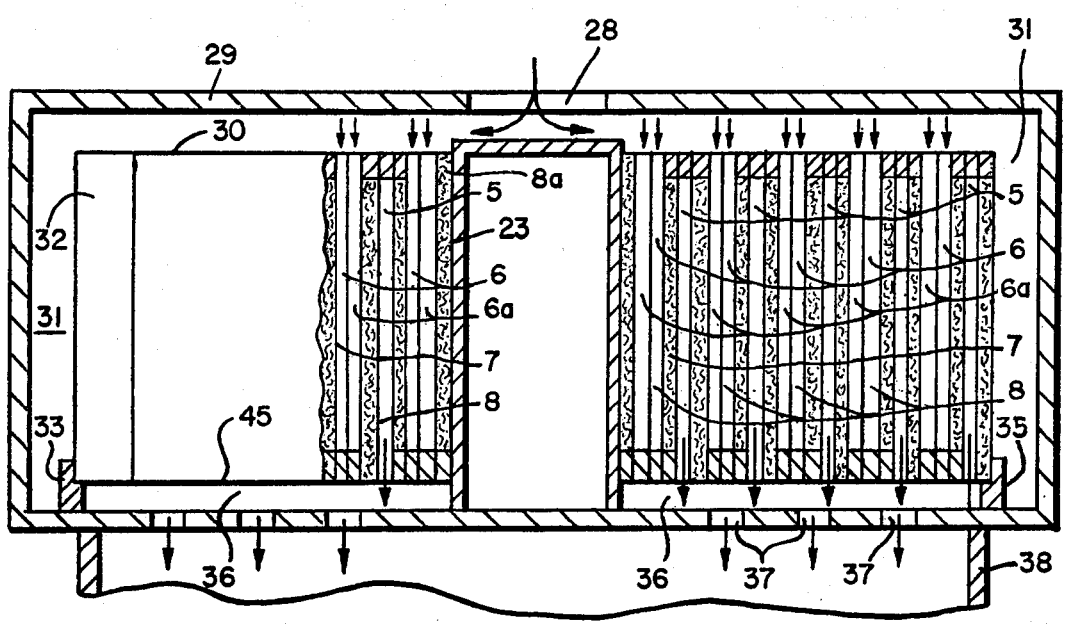
FIG. 4 is a cross-sectional view similar to FIG. 2 of an alternative multi-layer web that can be spirally wound to form the filter of this invention.

The filter construction shown in FIG. 4 can be employed when it is desired to increase the void volume of the spacer layer thereby increasing fluid capacity. For convenience, the common elements of the construction in FIGS. 2 through 4 will be identified by the same numbers. It is to be understood that the same results can be attained by employing one spacer layer having a thickness equal to the two spacer layers 6a and 6.

Figure 5:
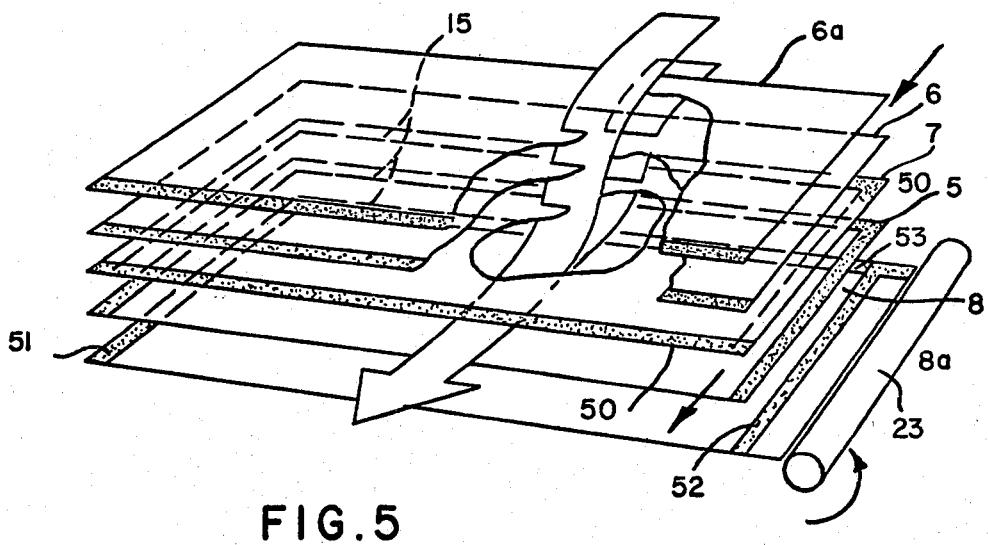
FIG. 5 is an isometric view of the spiral wound filter of FIG. 4 when unrolled.

The construction shown in FIGS. 4 and 5 is similar to that shown in FIGS. 2 and 3 but not identical. In the filter unit of FIGS. 4 and 5 two thicknesses of layer 6 are provided, the second being identified as 6a. Also, the adhesive pattern is reversed so that fluid flows into the filter unit through the edges of layers 6 and 6a and flows out of the unit through the edge of layer 5. The fluid flow path in the construction of FIG. 4 will now be described.

Incoming fluid enters opening 28 of housing 29 and is directed to the top surface 30 of filter cartridge 32 and into the space 31 between the housing 29 and the filter cartridge 32. Fluid is prevented from by-passing the filter cartredge 32 by means of sealing wall 33. Incoming fluid fills the space 31 and then is free to pass downwardly through the filter 32 by entering the void volume in spacers 6a and 6 and passing downwardly therein and through the filter layers 7 and 8 into spacer 5. Since the spacer 5 is unsealed on the bottom surface 45, the fluid is free to pass downwardly therethrough and out of the filter 32 into space 36 formed by the sealing wall 33, the bottom spiral surface 45 and the housing 29. The filtrate passes out of the space 36 through holes 37 in the bottom of the housing 29 into a fluid collector 38. Unfiltered fluid is prevented from passing between the outside surface of core 23 and the adjacent spacer layers 6 and 6a by means of adhesive strip 50 adhering the core 23 and layers 6, 6a and 7. Unfiltered fluid in space 31 also can enter the filter 32 through the outermost filter layer 8. Unfiltered fluid is prevented from entering the widthwise edge of spacer 5 by means of adhesive strip 51 shown in FIG. 5.

As shown in FIG. 5, the filter layer 8 forms the bottom surface of the multi-layer web with the upper layers being respectively the spacer layer 5, the filter layer 7, and the two spacer layers 6 and 6a. These layers are adhered in the manner described above and have adhesive strip 52 that fills the voids in spacer layer 5 and adheres spacer layer 5 to the adjacent portions of filter layer 7 and 8 thereby preventing incoming fluid from entering the cartridge 32 through the width of spacer layer 5. The adhesive strips 51 and 52 are applied at the desired locations, depending upon the size of the filter desired, by halting the moving webs and applying the adhesive across the width of spacer layer 5. Adhesive strip 53 prevents incoming unfiltered fluid from entering spacer layer 5.

The spacer layers can comprise either a woven or nonwoven material having a high void volume which is permeable to fluid flow in the edgewise direction and at reasonably high rates without the need for high inlet pressures. In addition, the spacer layer should have a thickness sufficiently great to permit substantial fluid flow rates but not so thick as to reduce filter surface area and filter capacity substantially for a given filter volume. It is preferred that the spacer layer be between about 0.020 and 0.030 inches thick. Suitable spacer layers include netting formed from plastic materials, cloth, paper of the like. A particularly suitable spacer layer comprises a netting formed by two sets of parallel plastic strands; one set of strands is laid on and adhered to one surface of the other set in an arrangement so that the sets of strands intersect at an angle. Suitable netting is available under the trade name "Vexar" from E. I. duPont deNemours & Co. The strands have a generally circular cross section. This structure when placed adjacent two flat filter layers has each set of strands in contact with only one adjacent filter layer so that fluid can pass easily into the spacer layer and between the two adjacent filter layers. This construction and its operation are described more fully in the above-identified concurrently filed and co-pending application of James L. Dwyer and Peter A. Reiman entitled "Spiral-Wound Filter".

The filter layer must be sufficiently pliable to permit winding it around the core without fracturing the filter. While many filter materials are sufficiently pliable for this purpose, some filter materials are too brittle to afford their use and must be modified prior to being incorporated in the multi-layer web. Such filter materials include microporous materials formed from cellulose esters such as cellulose acetate and cellulose nitrate and having an average pore size extending into the submicrometer range as small as about 0.025 micrometer, marketed by Millipore Corp. and identified as MF-Millipore(R) filter Celotate(R) Duralon(R) filters, Mitex(R) filters, Polyvic(R) filters, Solvinert(R) filters and Microweb(R) filters. To render these filters sufficiently pliable, they may be laminated between two pliable porous materials such as a woven cloth formed from polyester fibers with a net adhesive formed with heat-sealable resin fiber such as polyester, polyethylene or polyamide fibers. Particularly suitable laminates and their methods of preparation are disclosed in the patent application of Robert V. Tanona and Peter A. Reiman entitled "Filter Laminate Construction" filed Apr. 22, 1971, Ser. No. 136,309 and also assigned to the assignee of this application. However, it is to be understood that the present invention is not limited to the use of microporous filter layers but includes the use of any flat filter medium that can be wound in the desired configuration shown.

The type and amount of adhesive employed is such that adhesive will penetrate into the filter layer but not through the filter layer when applied so that sealing on one surface of a filter layer does not result in sealing on the opposite surface. Epoxy or Polyurethane-based adhesives are particularly useful for providing the desired sealing.

It is to be understood that the present invention is not limited to the structures specifically described but includes obvious modifications thereof. Thus, a filter construction can be prepared by spirally winding a multi-layer web having more than two filter layers and more than two spacer layers so long as they are arranged so that the spacer layers sealed on opposing surfaces do not contact. Thus, three or more alternating spacer and filter layers can be employed. However, these structures may increase production problems due to the added webs being unrolled and adhesive strips applied. Therefore, it is preferred to form the filter by winding a four layer web as specifically described above, in connection with FIGS. 1, 2, and 3.

Furthermore, it is to be understood that the spacer layers need not be as wide as the filter layers and the fluid-impermeable layers. Filter layers contacting opposing surfaces of a spacer layer can be sealed from the atmosphere at the spiral end surfaces without adhering the spacer layer. All that is necessary is that the seal prevent the entrance or exit of fluid where desired. However, since the spacer layer provides essential support to the adjacent filter it must contact at least a portion of the filter surface area so that the risk of rupturing the filter layer is not increased substantially. Furthermore, any means for forming a seal can be employed such as heat sealing, providing that the seal will permit the slip between layers which occurs upon winding the web on the core.

It should be pointed out that a multi-layer web comprising one filter layer and one spacer layer or one filter layer and two spacer layers could not be used without a fluid-impermeable layer because, when wound, each spacer layer would be sealed on both spiral surfaces.

While the present invention provides a filter having improved strength characteristics primarily because the filter layer is flat and is supported, the spacer layers need not be of uniform thickness. Our invention also contemplates the use of spacer layers taped along their width so that the edge surface of the spacer facing incoming unfiltered fluid will be relatively wide and gradually decreasing along the axial length of the wound filter. The adjacent spacer layer sealed on the spiral end surface facing incoming unfiltered fluid will be tapered in the opposite direction along the axial length of the wound filter. By employing the tapered spacer layers, fluid can more easily enter and leave the wound filter without greatly increasing its volume.

Furthermore, a solid core, although preferred, is not required in forming the spiral filter construction. If desired, the multi-layer web can be wound around a mandrel that is subsequently removed and the resultant central space is sealed so that unfiltered fluid cannot by-pass a filter layer.

Thus, we have provided an improved filter cartridge construction formed from a multi-layer web of filter material and spacer material which, in contrast to prior constructions, does not require a fluid-impervious layer in the web. This construction accomplishes the desired objective of providing a large filter area in a minimum volume, since it eliminates the fluid-impermeable layer, and the entire volume of the unit is comprised of "working" layers.

We claim:

1. A filter unit construction formed from a spirally-wound multi-layer material having two opposed spiral end surfaces, said multi-layer material including at least two flat filter layers and at least two spacer layers; each surface of each filter layer contacting a spacer layer in the spirally wound unit, except for the filter layer forming the outside surface of said unit, said spacer layers being sealed so that a first set of spacer layers contacting each filter layer on a first surface is open to the atmosphere on a first spiral end surface and closed to the atmosphere on the second spiral end surface and a second set of spacer layers contacting the second surface of each filter layer is open to the atmosphere on the second spiral end surface and closed to the atmosphere on the first spiral end surface, said spacer layers being arranged so that spacer layers open on opposing spiral end surfaces are not in contact, the first set of spacer layers being sealed from the atmosphere along the widthwise edge adjacent the center of the spirally-wound unit and along a widthwise portion remote from the center of the spirally-wound unit and the center of said spirally-wound unit being sealed from the atmosphere adjacent at least one spiral end surface.

2. The construction of claim 1 wherein the multi-layer web is wound around a core extending across the width of the web, said core being sealed from the atmosphere adjacent at least one spiral end surface.

3. The construction of claim 1 wherein the multi-layer web comprises two filter layers and two spacer layers.

4. The construction of claim 3 wherein the multi-layer web is wound around a core extending the width of the web, said core being sealed from the atmosphere adjacent at least one spiral end surface.

5. The filter construction of claim 1 wherein the filter layers comprise a laminate comprising a microporous filter material at least one surface of which is adhered to a macroporous flexible layer with a porous adhesive.

6. The filter construction of claim 3 wherein the filter layers comprise a laminate comprising a microporous filter material at least one surface of which is adhered to a macroporous flexible layer with a porous adhesive.

7. A filter construction comprising the spiral-wound filter unit of claim 1 and a housing to enclose said filter, said housing having means forming a fluid inlet and a fluid outlet and means for sealing the outside surface of said filter unit from said outlet.

8. A filter construction comprising the spirally-wound filter unit of claim 3 and a housing to enclose said filter, said housing having means forming a fluid inlet and a fluid outlet and means for sealing the outside surface of said filter from said outlet.

9. A filter construction comprising the spirally-wound filter unit of claim 5 and a housing to enclose said filter, said housing having means forming a fluid inlet and a fluid outlet and means for sealing the outside surface of said filter from said outlet.

10. The construction of claim 1 wherein the spacer layers comprise two sets of parallel strands, one set of strands being lain on the other set of strands, adhered thereto and arranged to intersect at an angle.

11. The construction of claim 2 wherein the spacer layers comprise two sets of parallel strands, one set of strands being lain on the other set of strands, adhered thereto and arranged to intersect at an angle.

12. The construction of claim 5 wherein the spacer layers comprise two sets of parallel strands, one set of strands being lain on the other set of strands, adhered thereto and arranged to intersect at an angle.

* * * * *